United States Patent Office 3,087,158
Patented Apr. 23, 1963

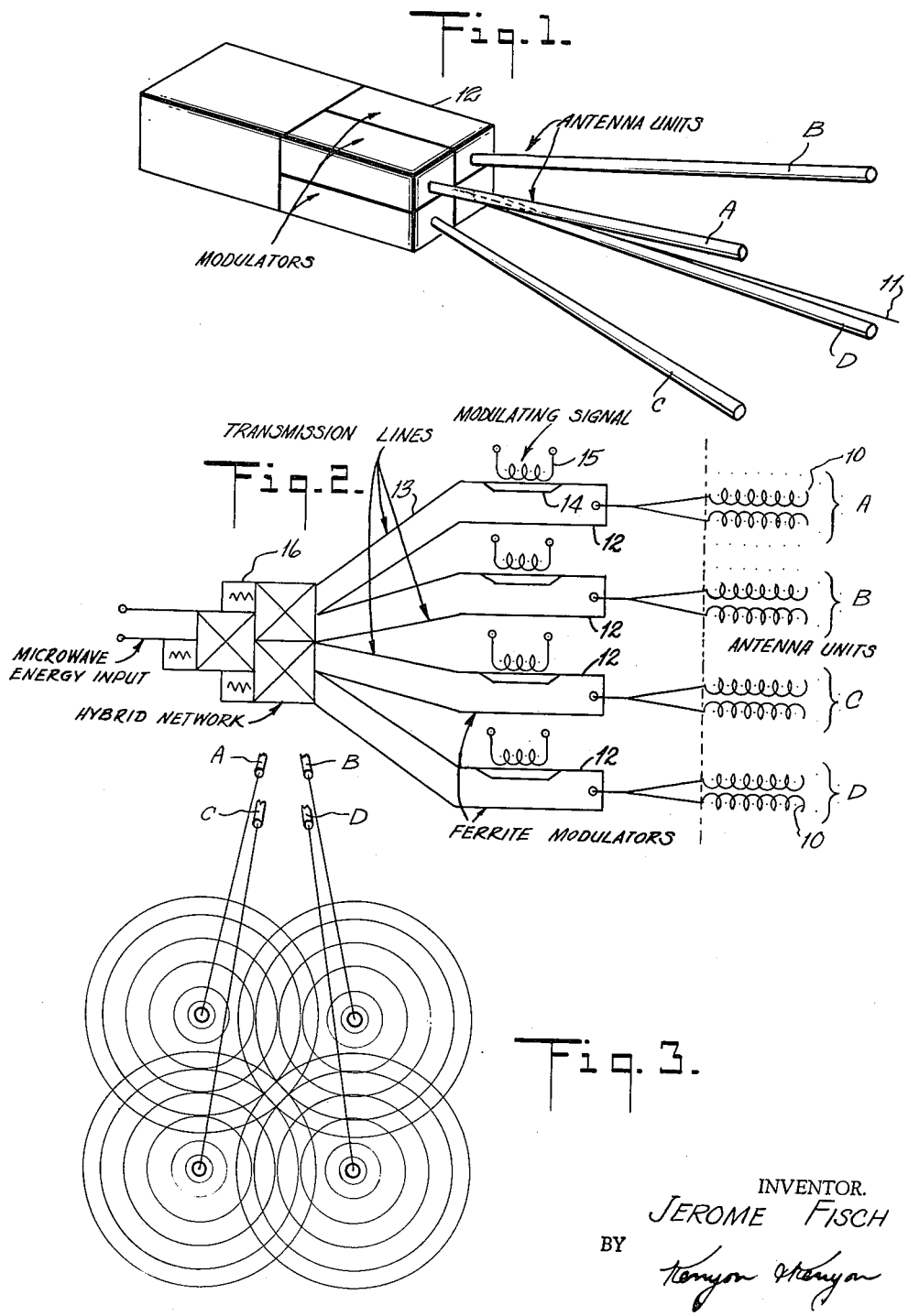

3,087,158
BROADSIDE ARRAY AMPLITUDE MODULATED FOR SCANNING
Jerome Fisch, Syosset, N.Y., assignor to Bulova Research and Development Laboratories, Inc., Long Island, N.Y., a corporation of New York
Filed Sept. 10, 1957, Ser. No. 683,078
4 Claims. (Cl. 343—787)

This invention relates generally to radar scanning systems and more particularly to a system utilizing an array of helical radiating elements which are energized by high frequency currents so modulated as to produce a conical scanning pattern without the need mechanically to move the antenna or antenna feed.

The effectiveness of any radar system is influenced decisively by the nature and quality of its antenna. The greatest range at which the radar can detect a target, the accuracy with which the direction to the target can be determined and the degree to which the target can be discriminated from its background or other targets all depend in large measure on the electrical properties of the antenna.

In radar scanning applications one of the problems that has been confronted is to design an antenna which will provide maximum performance with minimum space and weight requirements. A typical antenna utilized in many radar installations includes a parabolic reflector, which provides a pencil beam of radiation. Automatic tracking is accomplished to an accuracy of a small fraction of a degree by nutating this beam about the target in a conical scanning pattern. This is usually carried out by rotating or nutating an antenna feed in a small circle about the focus in the focal plane of the reflector or lens. This antenna feed may take the form of a spinning asymmetrical dipole or a nutating waveguide aperture. When the antenna is small a conical scanning pattern can also be achieved by rotating the reflector relative to a stationary feed.

While the conical scanning pattern is a highly efficient method of generating angle error information and has been very widely used in radar installations, it nevertheless has numerous disadvantages. Fire control radar antenna installations in pursuit type aircraft, for example, require an unobstructed view in the direction of flight. This necessitates the location of the antenna in the nose of the fuselage. Due to the severe streamlining requirements of high speed flight, the design configurations of these types of aircraft tend increasingly in the direction of the narrow tapered or so-called needle nose. The drag penalty incurred by an excessive frontal area at supersonic speeds becomes enormous and this streamlining requirement is, therefore, in direct conflict with the radar performance requirements for conventional radar antenna installations.

In view of the foregoing, the primary object of the present invention is to provide a fire control radar antenna which overcomes aperture size and scanning frequency limitations inherent in conventional conical scanners. More specifically, it is an object of the invention to provide a radar antenna presenting a relatively small frontal area and yet possessing a beam width equivalent to that of a radar antenna system of far greater frontal area.

A further object of this invention is to provide a radar antenna system in which the gain may be increased without increasing the frontal area.

Another object of the present invention is to provide a radar antenna system adapted to supply tracking data corresponding to that yielded by a conical scanner, but without rotating or nutating the antenna or antenna feed.

Yet another object of this invention is to provide a radar antenna system capable of much greater scanning rates than radar antenna systems in which the antenna or antenna feed are mechanically rotated.

The usefulness of any radar system is dependent upon its information producing capacity, and this can only be derived from the angular sector which the antenna can scan. Once the sector to be scanned has been determined, the scanning rate determines the frequency with which information within the sector can be examined and evaluated. The angular accuracy with which a radar system can determine the directions to a target depends upon the beam width of the radar antenna.

In conventional microwave antennas such, for example, as paraboloids, lenses, horns and broadside arrays, the beam width is essentially the same for a given aperture size or radiating area. In view of this relationship, it is not feasible to reduce the size of conventional radar antennas, for a reduction in size is accompanied by a decrease in the beam width.

Applicant has found, however, that an antenna configuration employing a plurality of helical antennas stacked in the direction of propagation does not have its beam width controlled solely by the area of the aperture. The gain of a helical antenna increases proportionally with an increase in axial length and additional gain may be obtained, therefore, by grouping several helical end fire antennas into a broadside array.

Briefly stated, a preferred system in accordance with the present invention comprises an antenna structure with a broadside array of four fixed antenna units which are angularly disposed with respect to each other, each antenna unit producing a beam encompassing one quadrant of the area to be scanned. Each unit is constituted by a group of helical coils, the gain of the system being directly proportional to the length of the coils. A scanning action throughout the four quadrants is obtained by a modulating network supplying high frequency energy to the units in a manner such that one or more of the four quadrants is blanked out at a time in any desired sequence.

For a better understanding of the present invention as well as further objects and features thereof, reference is made to the following detailed description to be read in conjunction with the accompanying drawings in which:

FIGURE 1 is a perspective view of a typical embodiment of the present invention.

FIGURE 2 is a schematic diagram of the fire control antenna illustrated in FIGURE 1, and FIGURE 3 is a perspective view illustrating the manner in which a scanning action is obtained with the device of the present invention.

An antenna array constructed in accordance with the present invention is illustrated in FIGURES 1 and 2 and employs a plurality of similar helical antenna units designated respectively by the letters A, B, C and D. Each unit is constituted by one or more helical radiating elements 10. As illustrated in FIGURE 1, each antenna unit is offset angularly with reference to the tracking axis 11 to produce respective beams encompassing separate quadrants of the area to be scanned such that by modulation means to be presently described the radiated pattern can be deflected from the tracking axis in the up, down, right and left direction to effect a conical scanning motion. The degree of angular offset of each antenna unit A, B, C and D from the tracking axis determines the width of the sector that will be scanned, and is preferably an angle equal to approximately one-half the beam width of the antenna unit.

This degree of angular offset from the tracking axis results in a rapid decrease in the intensity of radiation of each antenna unit in the vicinity of the tracking axis. This is illustrated in FIGURE 3 which diagrammatically depicts variations in radiation intensity for each antenna group. In this figure the maximum radiation intensity for each antenna group is represented by the central circle in each unit. Diminishing values of radiation intensity are represented by the successive concentric circles of increasing diameter. Due to the angular offset of each antenna unit with respect to the tracking axis, which coincides with the geometric center of the antenna array, the radiation intensity of each antenna unit decreases generally sinusoidally in the direction of the tracking axis. This provides a high angular sensitivity in the vicinity of the tracking axis which is necessary for automatic tracking of a target.

The helical radiating coils 10 in each of the antenna units A, B, C and D are proportioned in accordance with relations well known to those skilled in the art in order to obtain the desired wavelength and antenna gain. In general, once the helix pitch angle is chosen, this is maintained constant and the wavelength and antenna gain are selected on the basis that the diameter of the helical coil is proportional to wavelength and the length of the coil in number of turns is proportional to antenna gain. For a more detailed discussion of the design of such radiators reference is made to the text of J. D. Kraus entitled Antennas, and published in 1950.

In many antenna installations it is necessary to mechanically support the antenna and to protect it from shock and vibration. This is particularly important with the helical coils of the present invention since the spacing of each coil is a principal factor in the proper operation of the antenna. In accordance with the invention the coils 10, which make up each of the units are of identical design and are clustered together with their longitudinal axes in parallel relation. The coils forming the unit are maintained in spaced relation and are mechanically supported by a matrix of low loss dielectric material such for example as polyethylene, polystyrene, Teflon, etc. In practice, the matrix material may be molded about the coil cluster. The spacing between each coil within the matrix is preferably greater than one half wavelength in order to avoid interaction therebetween. The fact that the coils are held within a dielectric matrix whose velocity of propagation is less than that of free space must be taken into account in the design of the unit to permit the antenna array to operate at the desired frequency. For a given operating frequency, the coil length is substantially shorter than would be possible if operating in an air medium. It can therefore be seen that the dielectric matrix serves a two-fold function—it mechanically supports the antenna coils and acts to shorten the required length thereof. In addition, the resultant antenna pattern may be improved by properly shaping the dielectric to adjust side lobes and for other purposes.

Each of the four antenna units described above will project a beam encompassing one quadrant of the sector to be scanned as illustrated in FIGURE 3. In order to provide conical scanning it is desired that the point of maximum beam intensity rotate about an axis offset angularly with respect to the tracking axis 11. This can be accomplished if the energy component transmitted or received by each unit is modulated sinusoidally in the proper phase.

In order to accomplish this result, the following conditions are required where it is desired to blank one antenna unit at a time in rotational sequence in order to rotate the resultant pattern in a conical scanning pattern:

$$V_A \text{ (up)} = V(1+\cos\theta) = V(1+\cos\theta)$$
$$V_B \text{ (right)} = V(1+\sin\theta)(j) = V(j+j\sin\theta)$$
$$V_C \text{ (down)} = V(1-\cos\theta)(j^2) = V(-1+\cos\theta)$$
$$V_D \text{ (left)} = V(1-\sin\theta)(j^3) = V(-j+j\sin\theta)$$

where:

$V$ = radial beam component due to the angular relationship of each antenna element 10 with the tracking axis 11.
$\theta$ = modulation phase angle,
$j$ = 90° rotational operator Solving for the vector sum of the radial components:

$$V_A + V_B + V_C + V_D = 2V(\cos\theta + j\sin\theta) = 2Ve^{j\theta}$$

It can, therefore, be seen that the radial beam component remains constant in amplitude and rotates about the tracking axis at the modulation frequency.

The present invention, therefore, provides the equivalent of a conical scanning effect by a modulating network which blanks out one or more of the antenna units or quadrants being scanned, in a predetermined repetitive cycle. In this manner, a resultant received pattern is provided which consists of a rapid succession of resultant antenna beams which gives the same effect as that obtained by physical rotation or nutation of the antenna array.

Automatic tracking is therefore provided by the device of the present invention by rotating the point of maximum beam intensity about an axis offset angularly with respect to the tracking axis as indicated by the conical scanning equations presented above. With the radar scanning system of the present invention a target may be automatically tracked by feeding the received signal from each antenna unit into computer circuitry well known to those skilled in the art. The position of the target is essentially defined by the modulation on the return signal since the magnitude of the modulation is proportional to the angular offset or deviation of the target from the tracking axis, i.e. the axis of beam rotation or nutation, and the direction of offset or deviation of the target from the tracking axis is given by the timing of the modulation with respect to the beam rotation. If the beam is switched intermittently between the four quadrants instead of being conically scanned, i.e. sequentially switched, the target offset from the tracking axis is resolved directly into perpendicular components by subtracting the signals received from opposite pairs of quadrants.

In order to obtain a scanning action it is important that the radar signal be divided into four equal in-phase components and that these components be amplitude modulated without disturbing hte phase relationship. Available techniques for high speed modulation of microwave energy, however, do not permit this preservation of phase with sinusoidal modulation and square wave modulation is therefore used, which permits high speed modulation of the microwave energy while maintaining the phase relationship since only two signal amplitudes are utilized—no signal and full signal.

The modulation function is performed by ferrite amplitude modulators denoted generally by the numeral 12 in FIGURE 1. The four modulators are shown schematically in FIGURE 2 and consist of waveguide transmission lines 13 containing inserts or obstacles of ferrite material 14 and an electromagnetic coil 15 for creating a magnetic field within the ferrite to vary the properties thereof and thereby control the phase and amplitude of energy propagated through the guide.

As is well known to those skilled in the art, both the attenuation and phase shift of the microwave energy propagating through the waveguide may be controlled by varying the magnitude and direction of the magnetic field. In addition, the nature of the ferrite material permits these variations to be applied only to energy travelling in one direction if desired. This phenomenon is utilized by modulating only the received signals in order to avoid dissipation of the high power transmitted energy.

The inputs of the coils 15 may be connected to any conventional electronic switching means or circuitry (not shown) to interrupt the supply of energy thereto.

The antenna units as illustrated in FIGURE 2, are coupled by the transmission lines 13 to respective branches of a hybrid network denoted generally by the numeral 16. Network 16 is a four branch hybrid power divider and serves to divide the microwave energy into four equal in-phase components to be applied to each of the antenna units A, B, C and D. The individual beam components are maintained in phase by equalizing the electrical lengths from the input to each of the four antenna units or by other known phase adjusting expedients.

As stated previously a scanning action is obtained by amplitude modulating the microwave energy. Another method of obtaining a scanning action involves modulating the phase of the microwave energy rather than the amplitude and is referred to as phase scanning. In phase scanning the ferrite modulators are operated in such a manner as to modulate the phase of the microwave energy without varying the amplitude. If the phase of one of the antenna units, A, B, C or D is retarded with respect to the opposite unit, the composite antenna pattern will be deflected toward the retarded side. For example if antenna units A, B, C and D designate respectively the up, right, left and down group, if the phase of unit A is retarded with respect to unit D, the composite antenna pattern will be deflected toward unit A. If the necessary phase shift is applied sequentially to the four antenna groups, the desired conical pattern is generated. Phase scanning has the advantage that no physical angular displacement of any of the antenna units from the tracking axis is required, and the antenna units may be mounted parallel to the tracking axis for maximum gain.

It is to be understood that although four antenna units are shown in the figures, with two coils in each unit, these are merely illustrative and many other groupings and configurations are contemplated within the scope of the present invention. For example four antenna units are preferred since it permits tracking in two directions, i.e. azimuth and elevation, and provides two independent coordinates. If desired, however, two antenna units may be used resulting in tracking in one direction. Although the minimum number of units that may be used is two, any additional number may be used depending on whether it is desired to track in more than one direction and whether the signal will be resolved into rectangular or polar coordinates.

The number of helical coils 10 in each antenna unit is dependent upon the directivity desired of the antenna system. Although helical coils are inherently circularly polarized, if more than one coil is included in each antenna group linear polarization can be generated by using pairs of oppositely wound helices.

What has been described is a fire control radar antenna which resolves the conflict between minimum aircraft frontal area and maximum antenna area without compromising either of these factors. The antenna of the present invention provides a rapid scanning action within a given sector without nutating the antenna or antenna feed.

I claim:

1. A radar antenna system comprising a plurality of radiating units angularly disposed relative to each other and producing beams encompassing respective segments of the region to be scanned, transmission means coupled to each of said units to supply high frequency in phase pulse energy thereto, and amplitude-modulation means inserted in each of said transmission means to amplitude modulate the energy fed to each of said units with modulation components which are displaced relative to each other to effect a scanning action of said beams, each of said radiating units having at least one helical radiator adapted to project energy in a direction coincident with the axis of the helix.

2. A radar antenna system comprising a plurality of radiating units angularly disposed relative to each other and producing beams encompassing respective segments of the region to be scanned, transmission means coupled to each of said units to supply high frequency in-phase and equal amplitude pulse energy thereto, and amplitude-modulation means inserted in each of said transmission means to amplitude modulate the energy fed to each of said units with modulation components which are displaced relative to each other to effect a scanning action of said beams, each of said radiating units having a plurality of helical radiators adapted to project linearly polarized energy in a direction coincident with the axis of the helix.

3. A radar antenna system comprising a broadside array of four radiating units angularly disposed relative to each other symmetrically with respect to a central scanning axis to produce beams encompassing respective quadrants of the region to be scanned, transmission means coupled to each of said units to supply high frequency in-phase and equal amplitude pulse energy thereto, and amplitude-modulation means inserted in each of said transmission means to amplitude modulate the energy fed to said units with modulation components in phase quadrature to effect a scanning action of said beams, each of said radiating units having a plurality of helical radiators adapted to project linearly polarized energy in a direction coincident with the axis of the helix.

4. A radar antenna system comprising a fixed broadside array of four radiating units each of which is provided with at least one helical radiator adapted to project energy in a direction coincident with the axis of the helix, the respective helices of the four units being symmetrically arranged with respect to the central axis of a conical scanning pattern and being angularly disposed relative to each other to produce beams encompassing the up, down, right and left quadrants of said pattern, a source of high-frequency pulse energy, a four branch hybrid network coupling said source to said four radiating units to supply energy thereto in equal amplitude and like phase, an amplitude modulator interposed between each unit and said hybrid network, and means effecting operation of said modulators in quadrature relation to produce a sequential and cyclical modulation of energy fed to said units, thereby causing a conical scanning action.

References Cited in the file of this patent

UNITED STATES PATENTS

| | | |
|---|---|---|
| 1,667,792 | Martin | May 1, 1928 |
| 2,083,242 | Runge | June 8, 1937 |
| 2,412,703 | Wolff | Dec. 17, 1946 |
| 2,616,046 | Marston et al. | Oct. 28, 1952 |
| 2,630,530 | Adcock et al. | Mar. 3, 1953 |
| 2,802,183 | Read | Aug. 6, 1957 |
| 2,820,200 | Du Pre | Jan. 14, 1958 |
| 2,835,893 | Braund | May 20, 1958 |
| 2,876,448 | Guanella | Mar. 3, 1959 |

OTHER REFERENCES

"Ferrod Radiator Systems," by Reggia et al., IRE Convention Record, vol. 4, part 1, pages 213 to 224.

I.R.E. Convention Record, 1956, part I, vol. 4, page 84.